United States Patent
Gilani et al.

(10) Patent No.: US 10,360,177 B2
(45) Date of Patent: Jul. 23, 2019

(54) METHOD AND PROCESSING APPARATUS FOR GATING REDUNDANT THREADS

(71) Applicants: Advanced Micro Devices, Inc., Sunnyvale, CA (US); ATI Technologies ULC, Markham (CA)

(72) Inventors: Syed Zohaib M. Gilani, Markham (CA); Jiasheng Chen, Orlando, FL (US); QingCheng Wang, Shanghai (CN); YunXiao Zou, Shanghai (CN); Michael Mantor, Orlando, FL (US); Bin He, Orlando, FL (US); Timour T. Paltashev, Sunnyvale, CA (US)

(73) Assignees: ATI Technologies ULC, Ontario (CA); Advanced Micro Devices, Inc., Sunnyvale, CA (US)

(*) Notice: Subject to any disclaimer, the term of this patent is extended or adjusted under 35 U.S.C. 154(b) by 350 days.

(21) Appl. No.: 15/189,054

(22) Filed: Jun. 22, 2016

(65) Prior Publication Data

US 2017/0371393 A1 Dec. 28, 2017

(51) Int. Cl.
*G06F 15/80* (2006.01)
*G06F 1/3234* (2019.01)
*G06T 15/00* (2011.01)

(52) U.S. Cl.
CPC ........ *G06F 15/8007* (2013.01); *G06F 1/3234* (2013.01); *G06F 1/3243* (2013.01); *G06T 15/005* (2013.01); *Y02D 10/152* (2018.01)

(58) Field of Classification Search
None
See application file for complete search history.

(56) References Cited

U.S. PATENT DOCUMENTS

| | | | | |
|---|---|---|---|---|
| 5,557,734 A | * | 9/1996 | Wilson | G06T 1/20 345/505 |
| 6,195,674 B1 | * | 2/2001 | Elbourne | G06F 9/3879 708/401 |
| 8,429,380 B2 | * | 4/2013 | Hayashi | G06F 1/3203 712/22 |
| 8,468,191 B2 | | 6/2013 | Mantor et al. | |
| 2015/0067261 A1 | * | 3/2015 | Keramidas | G06F 12/0875 711/125 |

OTHER PUBLICATIONS

Gilani, Syed Zohaib et al., "Power-efficient Computing for Compute-intensive GPGPU Applications", 2013 IEEE 19th International Symposium on High Performance Computer Architecture (HPCA2013), Feb. 23-27, 2013, pp. 330-341, IEEE, Shenzhen, China.

* cited by examiner

*Primary Examiner* — Xiao M Wu
*Assistant Examiner* — Steven Z Elbinger
(74) *Attorney, Agent, or Firm* — Volpe and Koenig, P.C.

(57) ABSTRACT

Described is a method and processing apparatus to improve power efficiency by gating redundant threads processing. In particular, the method for gating redundant threads in a graphics processor includes determining if data for a thread and data for at least another thread are within a predetermined similarity threshold, gating execution of the at least another thread if the data for the thread and the data for the at least another thread are within the predetermined similarity threshold, and using an output data from the thread as an output data for the at least another thread.

18 Claims, 6 Drawing Sheets

METHOD AND PROCESSING APPARATUS FOR GATING REDUNDANT THREADS

TECHNICAL FIELD

The disclosed implementations are generally directed to shader blocks of graphics processors, and in particular, to saving power in the graphics processing pipeline.

BACKGROUND

Graphics processing units (GPUs) are parallel processors with large numbers of execution computing units and high-bandwidth memory channels to concurrently run thousands of threads in their shader blocks. Manufacturers have integrated more compute resources and operated them at higher frequencies to increase performance. This approach is not sustainable under a given power constraint as power consumption increases as integration increases. Power efficiency of the GPUs has to be improved to further increase GPU performance.

BRIEF DESCRIPTION OF THE DRAWINGS

A more detailed understanding can be had from the following description, given by way of example in conjunction with the accompanying drawings wherein.

DETAILED DESCRIPTION

Described is a method and processing apparatus to improve power efficiency by gating redundant threads processing. In particular, the method for gating redundant threads in a graphics processor includes determining if data for a thread and data for at least another thread are within a predetermined similarity threshold, gating execution of the at least another thread if the data for the thread and the data for the at least another thread are within the predetermined similarity threshold, and using an output data from the thread as an output data for the at least another thread.

In general, graphics processors or graphics processing units (GPUs) employ a large number of execution units such as single instruction, multiple data (SIMD)-type execution units in their shader blocks that operate in parallel to concurrently run thousands of threads processing vertex geometry, pixel colors or other data. For example, in some implementations the multiple threads execute a shader program per pixel such that each thread processes one pixel. In this type of architecture, neighbor pixels can be mapped to neighbor threads and 64 neighboring threads can be scheduled and executed together in a single wavefront or warp. For typical graphics workloads in this architecture, rendered neighbor pixels are either almost identical or the instructions in the shader program have almost identical inputs. Consequently, a significant amount of redundant data is processed to produce almost the same result across multiple threads in the wavefront. A method and processing apparatus is described herein that improves power efficiency of a GPU by detecting duplicated or almost identical redundant threads and gating off the circuits in some or all arithmetic logic units (ALU) execution units processing these redundant threads, which in some variations can be implemented as vector ALUs (VALU(s)) containing a group of ALUs. This can reduce the dynamic power of the GPU when rendering graphics and in particular, the power consumed by the ALUs that comprise the shader compute parts of the GPU.

Figure 1:
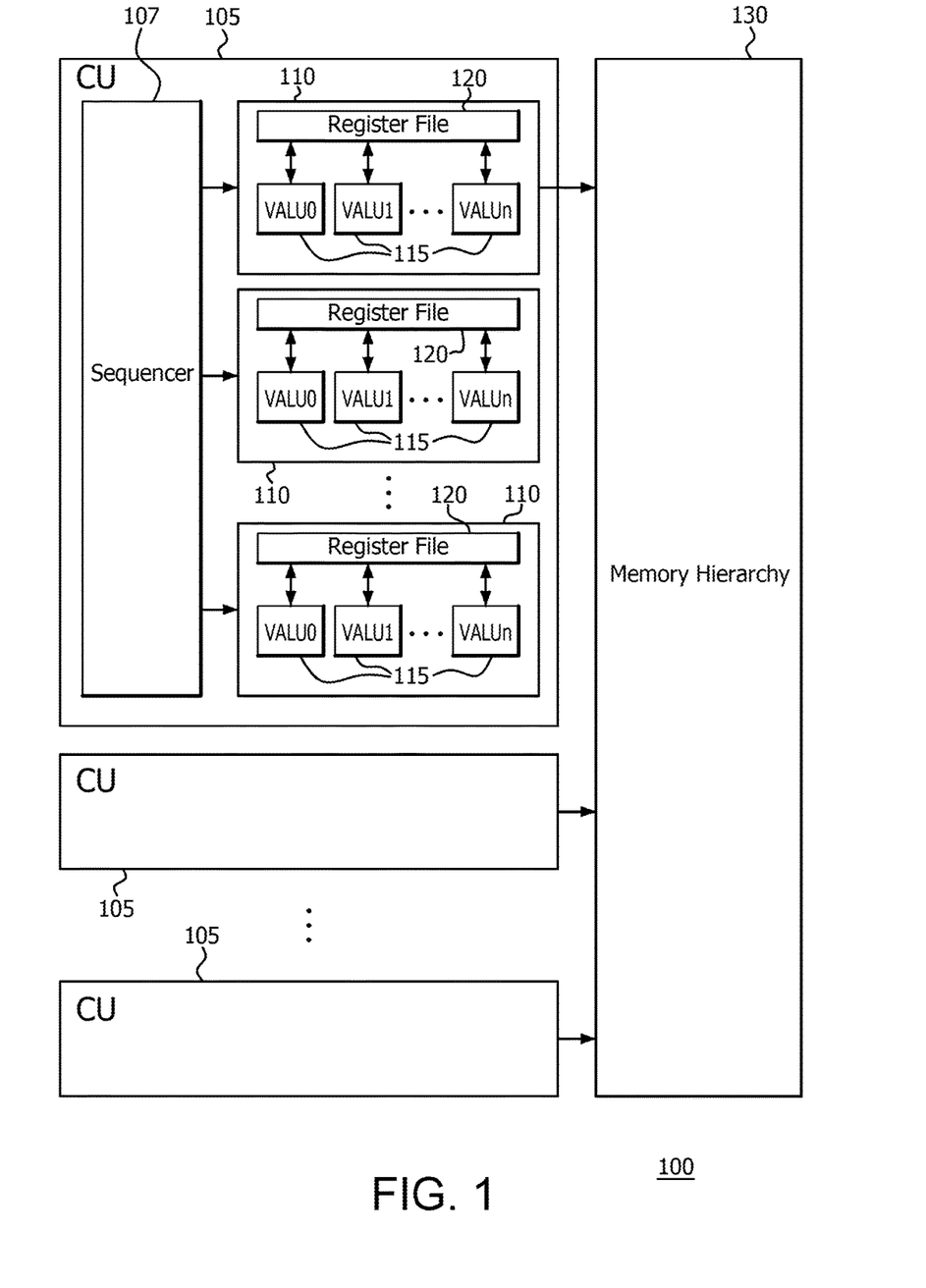
FIG. 1 is a high level block diagram of single instruction, multiple data (SIMD) units of a graphics processor shader block in accordance with certain implementations.

FIG. 1 is a high level block diagram of a shader block in an example graphics processor or GPU 100. The shader block of the graphics processor 100 can include compute units 105, where each compute unit 105 can include a sequencer 107 and multiple execution units, which in this example are single instruction, multiple data (SIMDs) units 110. Each SIMD unit 110 can include multiple VALUs 115, where each VALU 115 can be connected to a register file 120. Each compute unit 105 is connected to memory hierarchy 130 which can include L1, L2 and other level caches, specialty buffers and external dynamic random access memory (DRAM) interfaces. For example, in a Graphics Core Next (GCN) architecture, each compute unit 105 can include 4 SIMD units, each SIMD unit can include 4 VALUs and each VALU can include 4 ALUs.

Figure 2:
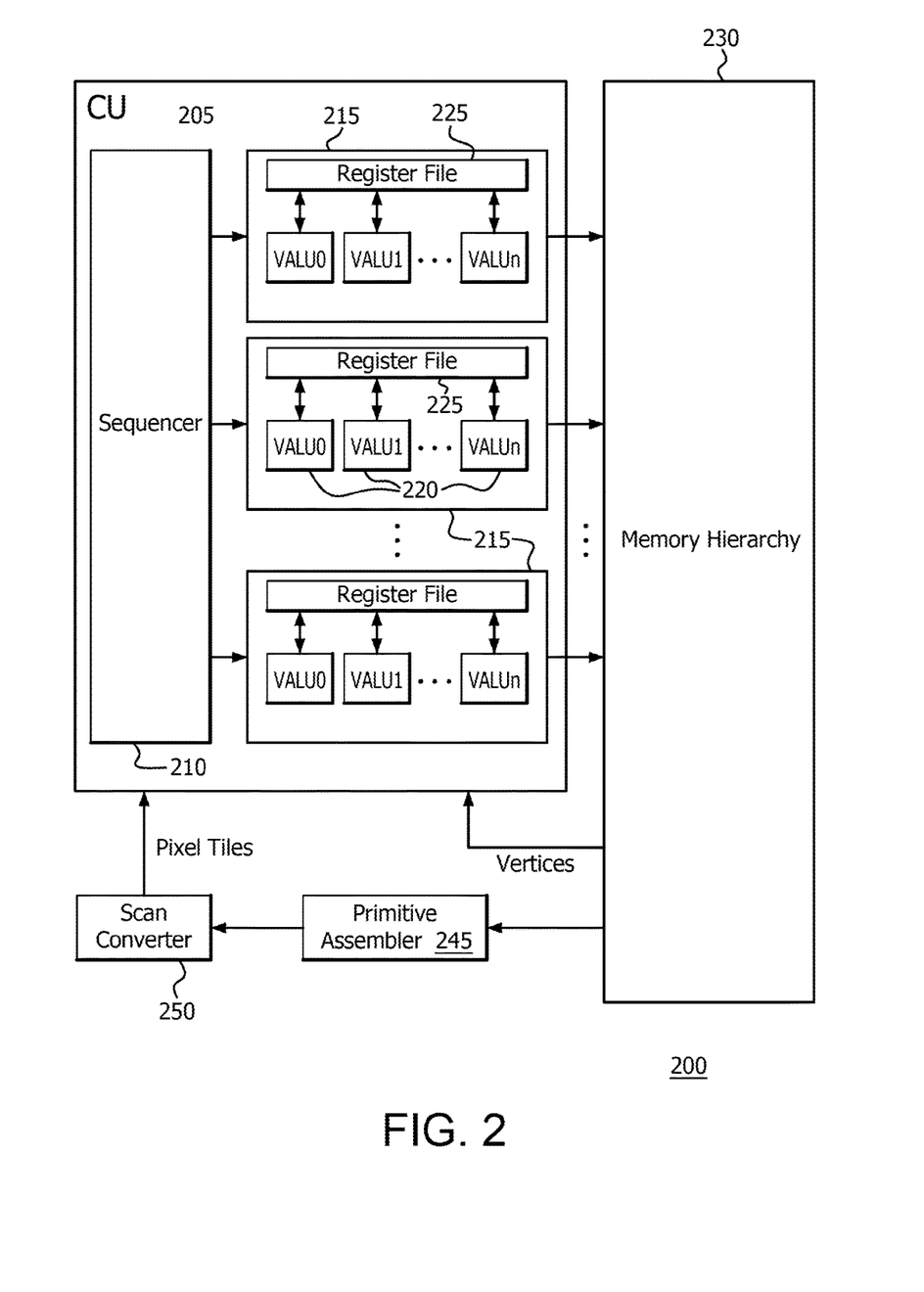
FIG. 2 is a high level block diagram of a graphics processor pipeline in accordance with certain implementations.

FIG. 2 is a high level block diagram of a graphics processor computation pipeline 200 that transforms a three-dimensional model into a two-dimensional image. The graphics processor computation pipeline 200 initially performs an instruction fetch, decode and schedule process by a sequencer 210 in a compute unit 205. The instruction and data can then be fed to execution units in a compute unit 210. The execution units can include 4 SIMDs 215, where each SIMD 215 in turn can include 4 VALUs 220. Each VALU 220 can be a group of 4 ALUs. The output of the compute unit 205 can be stored in a register file 225, or a memory hierarchy 230 which can include L1, L2 and other level caches, specialty buffers and external DRAM interfaces. In other implementations, the number of compute units, SIMDs, and ALUs included in a graphics processor computation pipeline 200 can vary.

Figure 4:
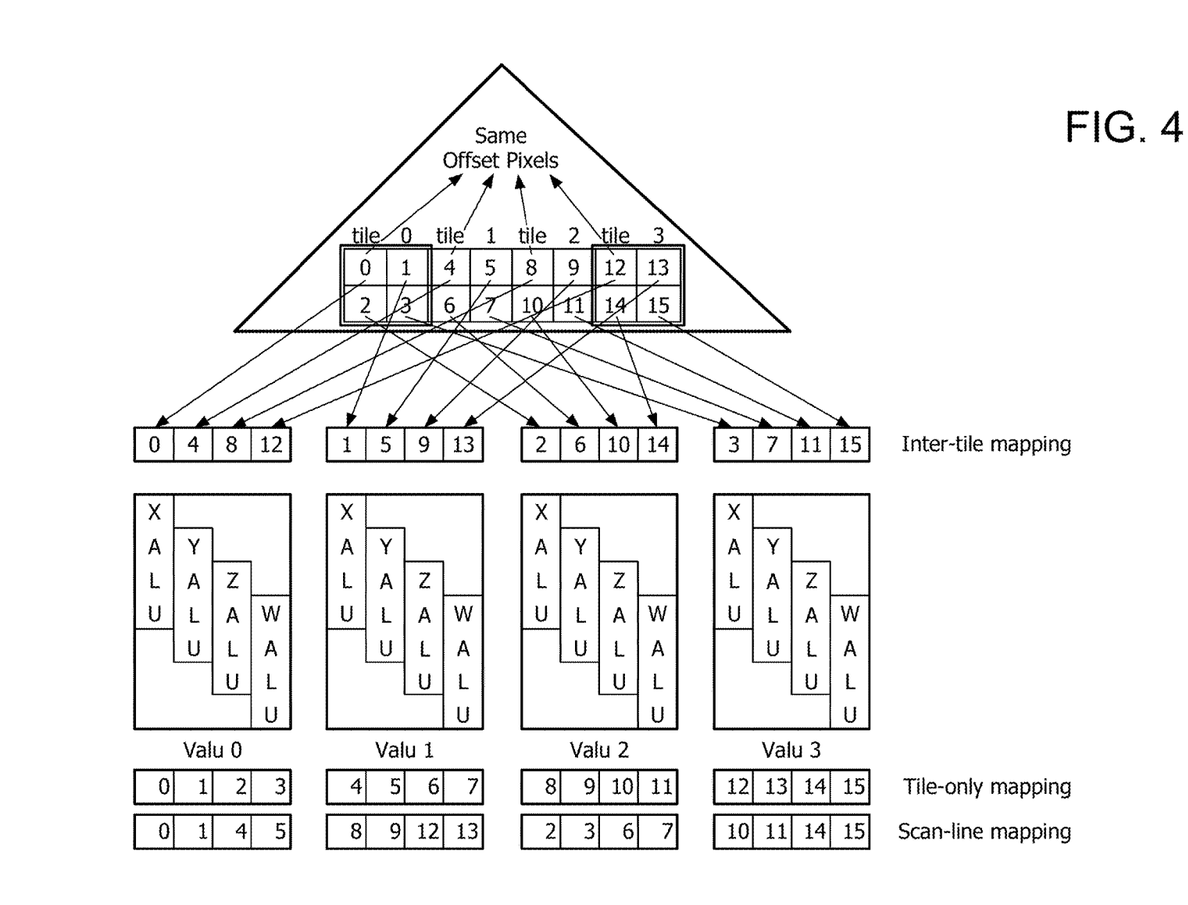
FIG. 4 is an illustration using the gating control circuit of FIG. 3 in accordance with a pixel thread distribution pattern on vector ALUs (VALUs)

Referring generally to both FIGS. 1 and 2, vertices, pixels and instructions are input into the graphics processor computation pipeline 200. The vertices after appropriate transforms are assembled into triangles in primitive assembler 245 and a scan convertor 250 rasterizes each triangle into many 2×2-pixel tiles, for example. Each tile can therefore have 4 pixels, and each pixel can be mapped to 4 consecutive threads. This architecture and processing pipeline begets two types of redundancy shading: 1) redundancy between 4 pixels within one tile having same or similar color component values, and 2) redundancy between pixels with the same offset between neighboring tiles. Pixel offset defines the position of the pixel inside a particular tile. For example, in a 4 pixel tile it can be 0, 1, 2, 3 as shown in FIG. 4. Although the example described herein uses 4 pixels per tile, other pattern scan converters can be also used.

Figure 3:
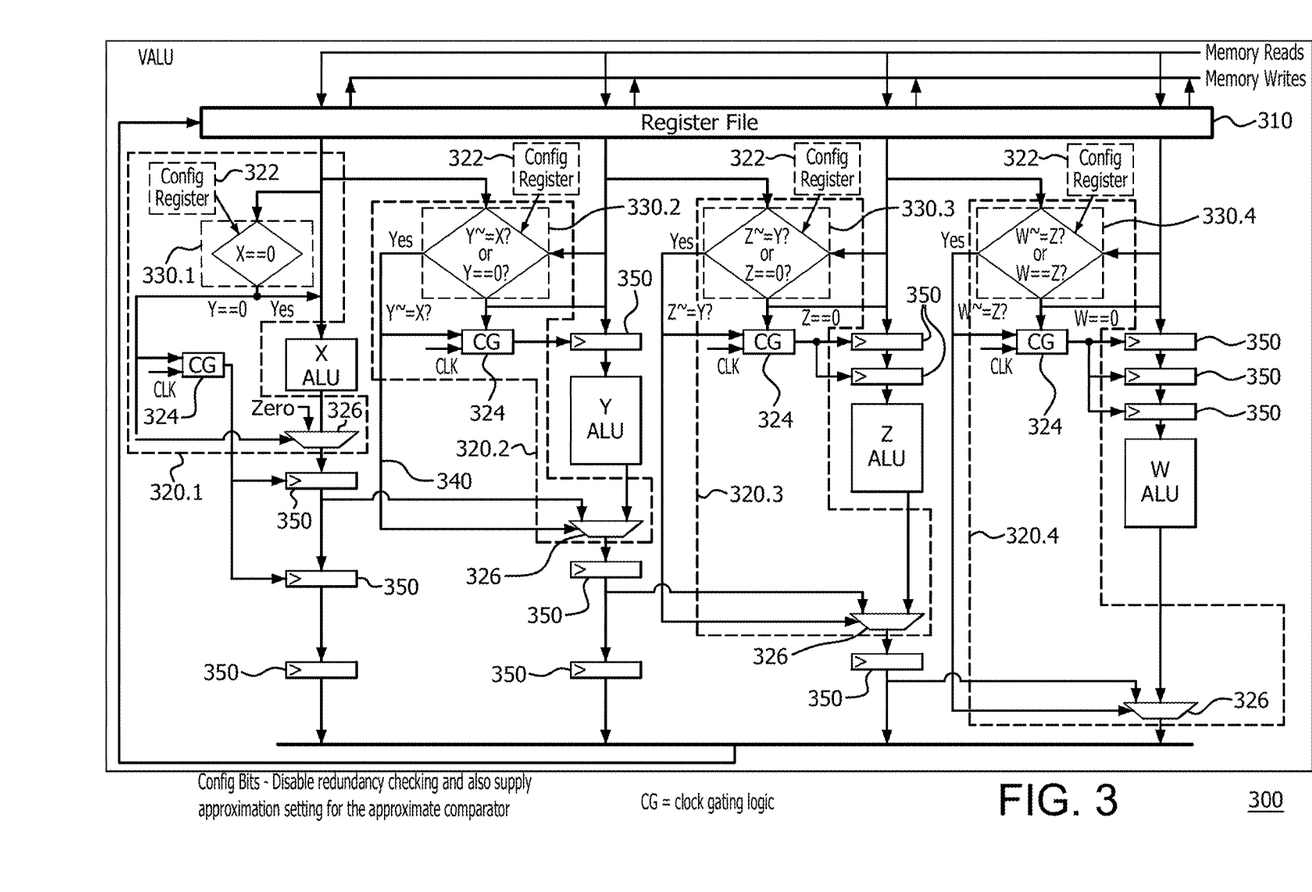
FIG. 3 is a block diagram of a gating control circuit in arithmetic logic unit (ALU) datapath in accordance with certain implementations.

FIG. 3 is a block diagram of a vector ALU (VALU) 300 that takes advantage of the second type of redundancy to reduce the vector ALU pipeline power, because, physically 4 pixels are mapped with the same offset from 4 tiles to 4 VALUs as described in U.S. Patent Application Publication No. US2011/0055308, which is incorporated herein by reference in its entirety. Although the example described herein takes advantage of the second type of redundancy, different pixel-thread or pixel-ALU mappings can be used to also take advantage of the first type of redundant shading using the redundant gating circuits described herein. For example, rasterization patterns can be different in various graphics architectures including, but not limited to, scanline or strip with multiple scanlines, tile, subtile, supertile and the like. Each rasterization pattern can have different pixel data locality and similarity patterns. Consequently, the mapping to SIMD processing blocks can be different. FIG. 4 illustrates inter-tile, tile-only, and scanline pixel mapping to SIMD processing blocks and is described herein below.

The VALU 300 can include different numbers of ALUs. For example, VALU 300 can include ALUs X, Y, Z and W. The VALU 300 can include a register file 310, redundant thread gating control circuits 320 and configuration registers 322. In the illustrated implementation, the redundant thread gating control circuits 320 can include redundant thread gating control circuits 320.1, 320.2, 320.3 and 320.4, which can be implemented or configured between a pair of ALUs, e.g. between ALUs X and Y, between ALUs Y and Z or between ALUs Z and W. Each redundant gating control circuit 320.1, 320.2, 320.3 and 320.4 can include a variable accuracy comparator 330.1, 330.2, 330.3 and 330.4, respectively, a clock gating logic 324 and a multiplexor 326. This multiplexor 326 position in redundant gating control circuit 320.1, for example, can be floating between the output of ALU X and the last staging register 350 depending on particular implementation. The register file 310 can be used to stage data between memory, (e.g. memory hierarchy 230), and each of the ALUs X, Y, Z and W intermediate results. The configuration registers 322 can be controlled by software drivers to turn off the redundant thread gating control circuits 320 to save power when running non-graphics applications as there cannot be sufficient redundant threads. The configuration registers 322 can also be used to setup the variable accuracy threshold for approximate comparison which can also be used for gating off almost identical redundant threads.

For purposes of illustration, the functional or operational aspects of the redundant thread gating control circuits 320 are described with respect to ALU X and ALU Y and redundant thread gating control circuit 320.2 but are applicable to any pair or any number of ALUs. Operationally, configuration bits in the configuration register 322 are checked to see if a graphics/image processing application is running and if an approximation threshold is defined. If a non-graphics application is running, the redundant thread gating control circuit 320.2 is bypassed and data from the register file 310 is processed normally by ALU Y. If a graphics/image processing application is running and approximation threshold is set in the configuration register 322, then a determination is made by a variable accuracy comparator 330.2 as to whether the data being input to ALU Y is the same or similar as the data being input into ALU X. This can be done using the variable accuracy comparator 330.2 as noted or any like device or circuit. If the data is not the same or similar enough, then the data from the register file 310 is processed normally by ALU Y. If the same or similar input data is being used by ALU X and ALU Y, a selection or enable signal 340 triggers the clock gating logic 324 to gate ALU Y's clocks to prevent ALU Y from processing the redundant execution. That is, the clock gating logic 324 can hold the contents constant and not toggle any bits. The selection or enable signal 340 also sets the multiplexor 326 to pass through the results from ALU X to ALU Y. The results from each of the ALUs X, Y, Z and W output registers are sent to register file 310 and eventually stored in memory. Stage or delay registers 350 can be used to align the input into each of the ALUs X, Y, Z and W and align the output from each of the ALUs X, Y, Z and W output registers. That is, every ALU is shifted on time by one clock versus a neighbor ALU.

Although the description above determines if the input data is the same as between certain ALUs, the comparison can also be implemented as an approximation with a certain level of accuracy to increase the power savings in the event of lower requirements with respect to image color fidelity. That is, a comparator can check if the data is within a predetermined similarity threshold and process accordingly. The similarity, (i.e., the level of accuracy needed or the setting of the predetermined similarity threshold), can be determined using conventional techniques and perceptible/perception measurement data. This implementation can require extra configuration bits for comparator control.

Although the description above bypasses the redundant thread gating control circuits 320 in the event of non-graphics applications, the redundant thread gating control circuits 320 can also be used for sparse data processing when zero-valued operands can exist in several threads. In this implementation, the variable accuracy comparators 330.1, 330.2, 330.3 and 330.4, for example, can also detect zero values and gate off or bypass appropriate multipliers in the ALU lanes. This implementation can require additional configuration bits to support this feature or this feature can be active all the time.

FIG. 4 is an illustration using the gating circuit of FIG. 3. In particular, the example below shows a typical pixel and thread mapping and the use of redundant thread gating to gate the ALU datapath lanes to save power. FIG. 4 shows 4 tiles, (tile 0, tile 1, tile 2 and tile 3), with 16 pixels numbered 0 to 16 that can be mapped to 16 ALUs grouped in 4 VALUs, for example. In particular, pixels 0, 4, 8, 12 can be assigned to VALU 0, pixels 1, 5, 9, 13 can be assigned to VALU 1, pixels 2, 6, 10, 14 can be assigned to VALU 2, and pixels 3, 7, 11, 15 can be assigned to VALU 3. As noted previously, the pixel and thread mappings are illustrative and other mappings can be used depending on the type of scan converter. In general, the data is checked in the same pattern as the scan converter distributes the data, (e.g. pixel data), to the ALUs with inter-tile, tile-only and scanline mappings as shown in FIG. 4.

As illustrated in FIG. 4, if pixel 4 from tile 1 and pixel 0 from tile 0 have the same or almost identical inputs, ALU Y will be gated to save power for VALU 0. If pixel 5 from tile 1 and pixel 1 from tile 0 have the same or almost identical inputs, ALU Y will be gated to save power in VALU 1. If pixel 9 from tile 2 and pixel 5 from tile 1 have the same or almost identical inputs, ALU Z will be gated to save power in VALU 1. If pixel 6 from tile 1 and pixel 2 from tile 0 have the same or almost identical inputs, ALU Y will be gated to save power in VALU 2. If pixel 14 from tile 3 and pixel 10 from tile 2 have the same or almost identical inputs, ALU W will be gated to save power in VALU 2. If pixel 7 from tile 1 and pixel 3 from tile 0 have the same or almost identical inputs, ALU Y will be gated to save power in VALU 3.

Figure 5:
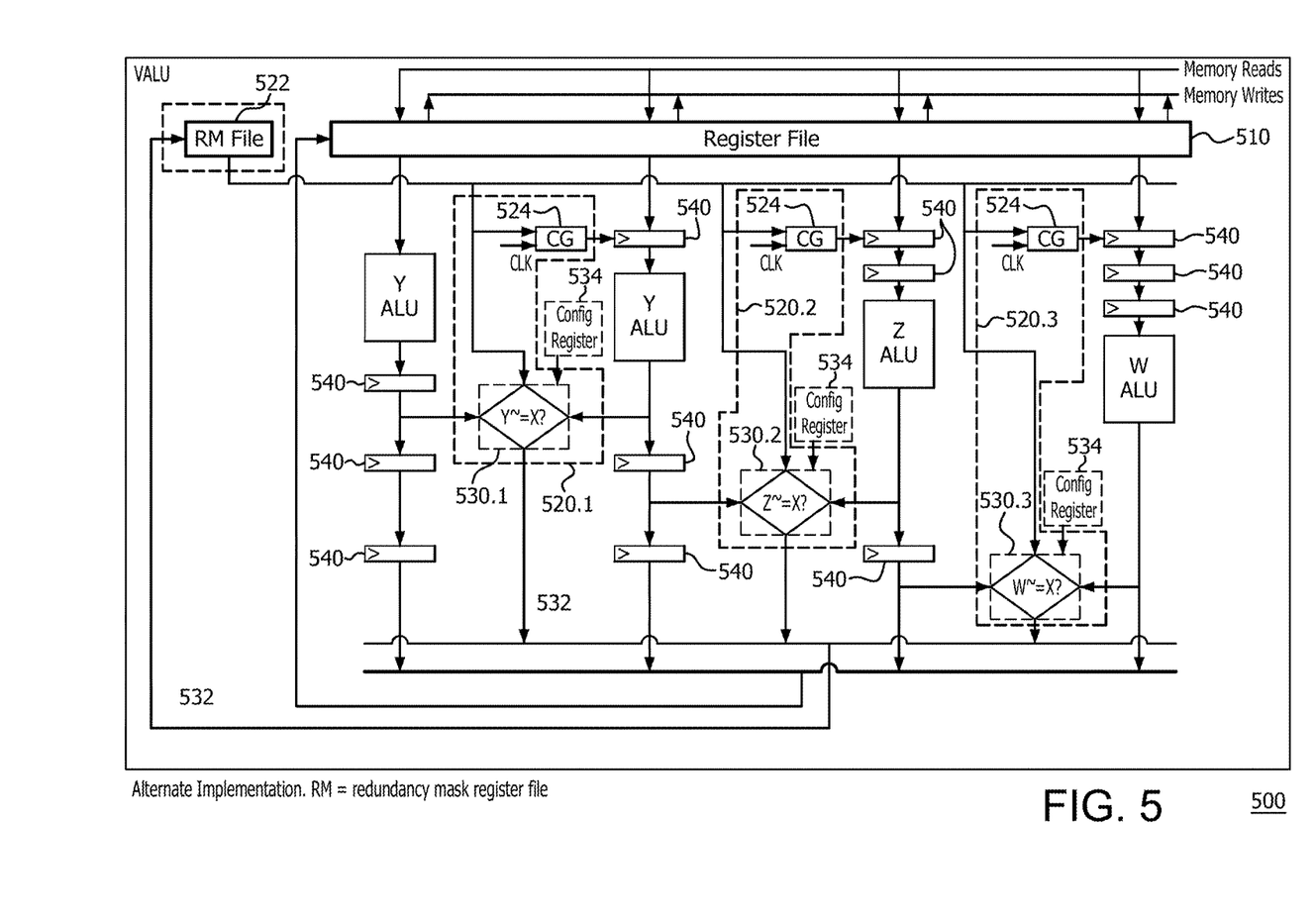
FIG. 5 is a block diagram of another gating control circuit with thread result equivalence detection and instruction marking in accordance with certain implementations.

FIG. 5 is a block diagram of another VALU 500 that can include a number of ALUs. For example, VALU 500 can include ALUs X, Y, Z and W, for example. The VALU 500 can include a register file 510, redundant thread gating control circuits 520 and a redundancy mask register file 522. In the illustrated implementation, the redundant thread gating control circuits 520 can include redundant thread gating control circuit 520.1, 520.2 and 520.3, which can be implemented or configured between a pair of ALUs, e.g. between ALUs X and Y, between ALUs Y and Z and between ALUs Z and W. Each redundant thread gating control circuit 520.1, 520.2 and 520.3, for example, can include a redundancy mask register file 522, a clock gating logic 524 and a comparator 530.1, 530.2 and 530.3, respectively. The register file 510 can be used to stage data between memory, (e.g. memory hierarchy 230), and each of the ALUs X, Y, Z and W. The redundancy mask register file 522 has a bit per operand for each ALU that is set when data for certain or all of the mapped threads are similar when running through variable accuracy comparators 530.1, 530.2 and 530.3 for the first time. The accuracy threshold for the comparators 530.1, 530.2 and 530.3 can be set in configuration registers 534 by the programmer. If all of the operands of an instruction have the redundant bit set, some execution lanes can be gated off to prevent redundant execution on the following passes, (data processing), of these operands. Stage or delay registers 540 can be used to align the input into each of the ALUs X, Y, Z and W and can be used to align the output from each of the ALUs X, Y, Z and W output registers.

Operationally, a determination is made as to whether the output of ALU Y is the same or almost identical, (similar), as the output of ALU X using the variable accuracy comparator 530. If the output is not the same or similar enough, then normal or conventional processing is performed. If the output is the same or similar enough, a redundant mask bit is set in the redundancy mask register file 522 associated with this set of operands (532). If all the operands of an instruction have the redundant bit set in the next operation, some execution lanes can be gated off in advance to prevent redundant execution using the clock gating logic 524. The results from each of the ALUs X, Y, Z and W are sent to register file 310 with duplication according to a redundancy mask, (based on or generated from redundancy mask register file 522), if required, and eventually stored in memory. As noted above, the similarity, (i.e., level of accuracy needed or the setting of the predetermined similarity threshold), can be determined using conventional techniques and perceptible/perception measurement data.

Although the description above for FIG. 5 determines if the input data is the same or similar enough as between certain ALUs, additional clock gating techniques can be employed in the event of a zero output result and on the next pass the ALU path for such operands can be gated off and bypassed. A hardwired zero result can be sent to the output using a special multiplexor controlled by the redundancy mask.

Figure 6:
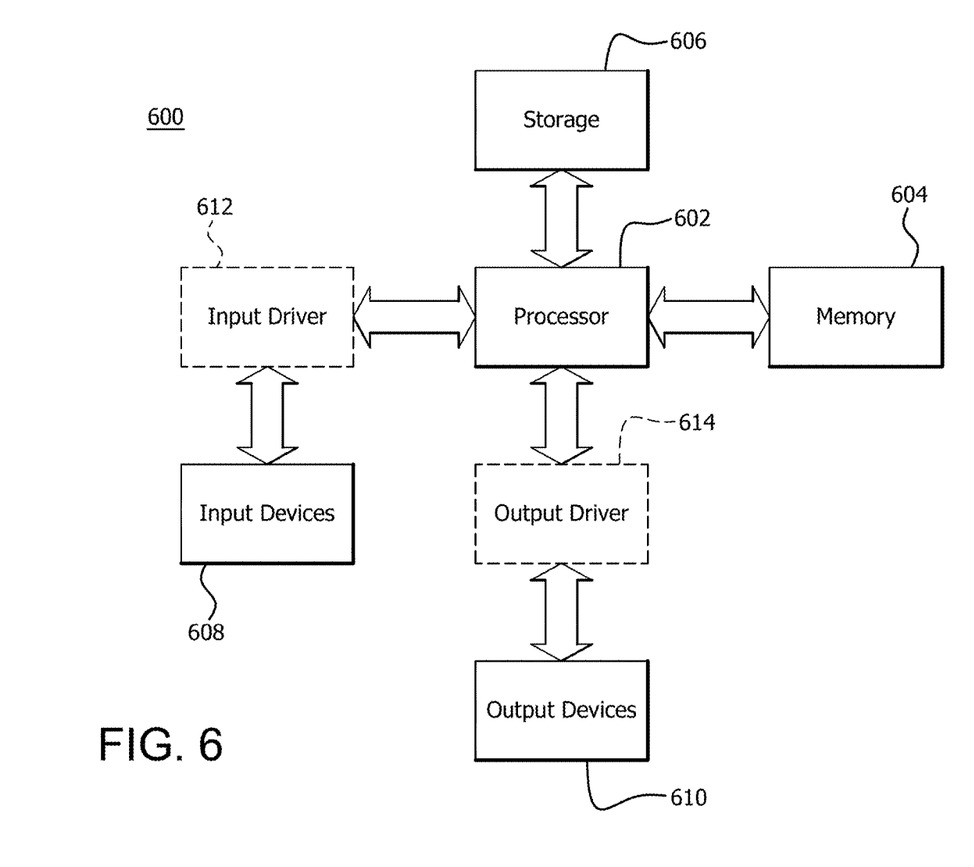
FIG. 6 is a block diagram of an example device for implementing the described method and processing apparatus.

FIG. 6 is a block diagram of an example device 600 in which one or more portions of one or more disclosed implementations can be implemented. The device 600 can include, for example, a head mounted device, a server, a computer, a gaming device, a handheld device, a set-top box, a television, a mobile phone, or a tablet computer. The device 600 includes a processor 602, a memory 604, a storage 606, one or more input devices 608, and one or more output devices 610. The device 600 can also optionally include an input driver 612 and an output driver 614. It is understood that the device 600 can include additional components not shown in FIG. 6.

The processor 602 can include a central processing unit (CPU), a graphics processing unit (GPU), a CPU and GPU located on the same die, or one or more processor cores, wherein each processor core can be a CPU or a GPU. The memory 604 can be located on the same die as the processor 602, or can be located separately from the processor 602. The memory 604 can include a volatile or non-volatile memory, for example, random access memory (RAM), dynamic RAM, or a cache.

The storage 606 can include a fixed or removable storage, for example, a hard disk drive, a solid state drive, an optical disk, or a flash drive. The input devices 608 can include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 610 can include a display, a speaker, a printer, a haptic feedback device, one or more lights, an antenna, or a network connection (e.g., a wireless local area network card for transmission and/or reception of wireless IEEE 802 signals).

The input driver 612 communicates with the processor 602 and the input devices 608, and permits the processor 602 to receive input from the input devices 608. The output driver 614 communicates with the processor 602 and the output devices 610, and permits the processor 602 to send output to the output devices 610. It is noted that the input driver 612 and the output driver 614 are optional components, and that the device 600 will operate in the same manner if the input driver 612 and the output driver 614 are not present.

In general, a method for gating redundant threads processing in a graphics processor shader block includes determining if data for a thread and data for at least another thread are within a predetermined similarity threshold, gating execution of the at least another thread if the data for the thread and the data for the at least another thread are within the predetermined similarity threshold and using an output data from the thread as output data for the at least another thread. The method can further include disabling a redundant thread gating control circuit when a non-graphics application is running on the graphics processor. The method can further include enabling zero detection mode for sparse data, wherein detection of zero values for operands and output gates off execution of relevant thread. The method can further include generating a signal if the data for the thread and the data for the at least another thread are within the predetermined similarity threshold and sending the signal to a clock gating circuit to trigger gating of the at least another thread. The method can further include setting a multiplexor to select the output data from the thread in response to receiving the signal. The data for the thread and the data for the at least another thread can be input data. The data for the thread and the data for the at least another thread can be output data. The bit can be set in a redundancy mask register file when the data for the thread and the data for the at least another thread are within the predetermined similarity threshold.

In general, a graphics processor can include a comparator for determining if data for a processing unit and data for at least another processing unit are within a predetermined similarity threshold, a clock gating circuit for gating execution of the at least another processing unit if the data for the processing unit and the data for the at least another processing unit are within the predetermined similarity threshold and a multiplexor for using an output data from the processing unit as an output data for the at least another processing unit. The graphics processor can include a configuration register, where a configuration bit that is set in the configuration register indicates that the comparator is bypassed when a non-graphics application is running on the graphics processor. The comparator can generate a signal if the data for the processing unit and the data for the at least another processing unit are within the predetermined similarity threshold and the comparator can send the signal to the clock gating circuit to trigger gating of the at least another processing unit. The multiplexor can receive the signal to select the output data from the processing unit. The data for the processing unit and the data for the at least another processing unit can be input data. The data for the processing unit and the data for the at least another processing unit can be output data. The graphics processor can include a redundancy mask register, where a bit is set if the data for the processing unit and the data for the at least another processing unit are within the predetermined similarity threshold.

In general, a computer readable non-transitory medium including instructions which when executed in a graphics processor cause the graphics processor to execute a method for gating redundant threads, where the method includes determining if data for a thread and data for at least another thread are within a predetermined similarity threshold, gating execution of the at least another thread if the data for the thread and the data for the at least another thread are within the predetermined similarity threshold, and using an output data from the thread as an output data for the at least another thread. The method can further include disabling a redundant thread gating circuit when a non-graphics application is running on the graphics processor. The method can further include generating a signal if the data for the thread and the data for the at least another thread are within the predetermined similarity threshold and sending the signal to a clock gating circuit to trigger gating of the at least another thread. The method can further include setting a multiplexor to select the output data from the thread in response to receiving the signal. The data for the thread and the data for the at least another thread are one of input data and output data.

In general and without limiting implementations described herein, a computer readable non-transitory medium including instructions which when executed in a processing apparatus cause the processing apparatus to execute a method for redundant thread gating.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the implementations.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for gating redundant threads processing in a graphics processor shader block, the method comprising:
   determining whether a non-graphics application is running on the graphics processor;
   if the non-graphics application is running, bypassing a redundant thread control gating circuit, otherwise:
      determining, if data for a thread and data for at least another thread are within a predetermined similarity threshold; and
      gating execution of the at least another thread and using an output data from the thread as output data for the at least another thread if the data for the thread and the data for the at least another thread are within the predetermined similarity threshold.

2. The method of claim 1, further comprising:
   enabling zero detection mode for sparse data, wherein detection of zero values for operands and output gates off execution of the at least another thread.

3. The method of claim 1, further comprising:
   generating a signal if the data for the thread and the data for the at least another thread are within the predetermined similarity threshold; and
   sending the signal to a clock gating circuit to trigger gating of the at least another thread.

4. The method of claim 3, further comprising:
   setting a multiplexor to select the output data from the thread in response to receiving the signal.

5. The method of claim 1, wherein the data for the thread and the data for the at least another thread are input data.

6. The method of claim 1, wherein the data for the thread and the data for the at least another thread are output data.

7. The method of claim 6, wherein a bit is set in a redundancy mask register file when the data for the thread and the data for the at least another thread are within the predetermined similarity threshold.

8. A graphics processor, comprising:
   a configuration register, wherein a configuration bit set in the configuration register indicates whether a non-graphics application is running on the graphics processor;
   a comparator for determining if data for a processing unit and data for at least another processing unit are within a predetermined similarity threshold, wherein the comparator is bypassed or disabled if the non-graphics application is running on the graphics processor;
   a clock gating circuit for gating execution of the at least another processing unit if the data for the processing unit and the data for the at least another processing unit are within the predetermined similarity threshold; and
   a multiplexor for using an output data from the processing unit as an output data for the at least another processing unit.

9. The graphics processor of claim 8,
   wherein a configuration bit that is set in the configuration register indicates that the comparator is bypassed when a non-graphics application is running on the graphics processor.

10. The graphics processor of claim 8, wherein:
the comparator generates a signal if the data for the processing unit and the data for the at least another processing unit are within the predetermined similarity threshold; and
the comparator sends the signal to the clock gating circuit to trigger gating of the at least another processing unit.

11. The graphics processor of claim 10, wherein the multiplexor receives the signal to select the output data from the processing unit.

12. The graphics processor of claim 8, wherein the data for the processing unit and the data for the at least another processing unit are input data.

13. The graphics processor of claim 8, wherein the data for the processing unit and the data for the at least another processing unit are output data.

14. The graphics processor of claim 13, further comprising:
a redundancy mask register, wherein a bit is set if the data for the processing unit and the data for the at least another processing unit are within the predetermined similarity threshold.

15. A computer readable non-transitory medium including instructions which when executed in a graphics processor cause the graphics processor to execute a method for gating redundant threads, the method comprising:
determining whether a non-graphics application is running on the graphics processor;
if the non-graphics application is running, bypassing a redundant thread control gating circuit, otherwise:
determining if input data for a thread and input data for at least another thread are within a predetermined similarity threshold, and
gating execution of the at least another thread and using an output data from the thread as output data for the at least another thread if the input data for the thread and the input data for the at least another thread are within the predetermined similarity threshold.

16. The computer readable non-transitory medium of claim 15, further comprising:
generating a signal if the data for the thread and the data for the at least another thread are within the predetermined similarity threshold; and
sending the signal to a clock gating circuit to trigger gating of the at least another thread.

17. The computer readable non-transitory medium of claim 16, further comprising:
setting a multiplexor to select the output data from the thread in response to receiving the signal.

18. The computer readable non-transitory medium of claim 15, wherein the data for the thread and the data for the at least another thread are one of input data and output data.

* * * * *